Patented Dec. 30, 1952

2,623,908

UNITED STATES PATENT OFFICE 2,623,908

PROCESS FOR MAKING 4,4'-ISOPROPYLIDENEDIPHENOL

Wesley C. Stoesser, Midland, and Edmund H. Sommerfield, Bay City, Mich., assignors to The Dow Chemical Company, Midland, Mich., a corporation of Delaware No Drawing. Application November 23, 1951, Serial No. 257,932

12 Claims. (Cl. 260—619)

1

This invention concerns an improved process for the production of 4,4'-isopropylidenediphenol by reaction of phenol with acetone in the presence of an acidic condensing agent. It relates more particularly to a novel procedure for separating the 4,4'-isopropylidenediphenol from the reaction product and pertains to improvements in a procedure for carrying out the reaction.

The preparation of 4,4'-isopropylidenediphenol by reaction of phenol with acetone is well known. United States Patent No. 2,359,242 describes a procedure wherein phenol and acetone are reacted in the presence of an acid-acting condensing agent and a sulfur-containing catalyst by introducing an acid such as hydrochloric acid, hydrogen chloride, or sulfuric acid, into a mixture of the reactants and a sulfur-containing catalyst at room temperature or thereabout. The reaction of phenol with acetone in the presence of hydrogen chloride as the condensing agent, but in the absence of a sulfur-containing catalyst, is described in United States Patent No. 2,191,831. As pointed out in the latter patent, the reaction occurs most favorably when carried out at temperatures below 80° C. using at least three moles of phenol per mole of acetone and employing substantially anhydrous hydrogen chloride as the condensing agent. The 4,4'-isopropylidenediphenol may be separated from the crude reaction product in any usual way, e. g. by distilling therefrom unreacted phenol, water formed in the reaction, and the acid condensing agent if the latter is volatile; or by crystallization of the product from a solvent such as dilute acetic acid, chlorobenzene, or ethylene dichloride.

The procedures heretofore proposed for carrying out the reaction of phenol with acetone to form 4,4'-isopropylidenediphenol have not been entirely satisfactory for production of the compound on a commercial scale, particularly with regard to the methods heretofore proposed for separating the 4,4'-isopropylidenediphenol from the crude reaction product. By-products which are difficultly separable from the desired 4,4'-isopropylidenediphenol product by distillation methods are often formed in the reaction. Crystallization of the product from a solvent is expensive and adds to the cost of the operations. Freeing the product from the acidic condensing agent, or from trace impurities which impart an objectionable odor to the same such as may occur when using a sulfur-containing catalyst to promote the condensation reaction, frequently involve the carrying out of additional operations which add to the cost of the product.

We have now found that the 4,4'-isopropylidenediphenol can readily be separated from the crude reaction mixture obtained by reacting phenol with acetone in the presence of a volatile acidic condensing agent, in a form substantially free from by-products of the reaction, the acidic condensing agent, or sulfur-containing catalysts, and recovered as a product of high purity, by a procedure which involves carrying out the reaction at temperatures below 100° C. until the reaction mixture forms, or consists of, a slurry or mass of crystals comprising 4,4'-isopropylidenediphenol and liquid at temperatures between 40° and 80° C., then separating the crystals from the liquid, washing the crystals with liquid phenol and heating the crystals to distill phenol from the 4,4'-isopropylidenediphenol product.

By separating the crystalline material from the liquid in which it is formed and washing the crystals with liquid phenol at temperatures below 80° C., preferably at from 42° to 50° C., intermediates or by-products of the reaction, e. g. colored impurities, together with the acidic condensing agent, or sulfur-containing catalyst, are displaced from the crystals leaving a crystalline material consisting principally of phenol and the 4,4'-isopropylidenediphenol product. The product is recovered from the crystalline material by heating the same in vacuum to distill the phenol from the 4,4'-isopropylidenediphenol.

The liquid from the crude reaction mixture may be combined with the liquid phenol used to wash the crystals and the combined filtrate reused in a succeeding reaction. The filtrate is preferably heated to distill off the water formed in the reaction, together with the volatile acidic condensing agent prior to being used in a succeeding reaction. Such distillation may suitably be carried out by heating the filtrate in vacuum at from 50 to 700 millimeters absolute pressure. The filtrate contains unreacted phenol and by-products of the reaction, e. g. colored impurities, together with 4,4'-isopropylidenediphenol. It may advantageously be recycled in the process both as medium and to supply a portion of the phenol in succeeding reactions.

The proportion of 4,4'-isopropylidenediphenol in the filtrate is dependent in part upon the temperature of the liquid phenol used to wash the crystalline material. The proportion of 4,4'-isopropylidenediphenol that is dissolved in the liquid phenol washings becomes greater as the temperature is raised. At temperatures of from 42° to 50° C. the liquid phenol dissolves only a minor proportion, e. g. 15 per cent or less, of its weight of the 4,4'-isopropylidenediphenol. At higher temperatures, e. g. at temperatures of from 60° to 80° C., the phenol dissolves a larger proportion of the product. For this reason, the crystalline material comprising 4,4'-isopropylidenediphenol which is separated from the crude reaction mixture is preferably washed with liquid phenol at temperatures between 42° and 50° C., although liquid phenol at temperatures of from 42° to 80° C. may be used.

The operations of separating impure crystalline 4,4'-isopropylidenediphenol from the liquid in which it is formed, heating the liquid to distill water therefrom and employing the liquid, both as medium and to supply a portion of the phenol reactant in making a further quantity of 4,4'-isopropylidenediphenol may be repeated a large number of times to produce 4,4'-isopropylidenediphenol of good quality, i. e. of good color and high purity. Satisfactory results have been obtained after returning the liquid to succeeding reactions for as many as twenty times.

The crystalline material comprising 4,4'-isopropylidenediphenol may be separated from the liquid by heating the crude reaction mixture, preferably in vacuum, e. g. at from 50 to 700 millimeters absolute pressure, to distill water formed in the reaction and the volatile acidic condensing agent therefrom, then cooling the mixture to temperatures between 40° and 80° C., preferably 40° to 50° C., to obtain a slurry of crystals and liquid, and separating the crystals from the liquid in any usual way, e. g. by filtering. The crystalline material is washed with liquid phenol to remove the entrained liquid. The filtrate is reused in the process to supply a portion of the phenol in succeeding reactions. The 4,4'-isopropylidenediphenol product is recovered by heating the crystalline material in vacuum to distill phenol therefrom.

The acidic condensing agent employed in the reaction is one which is soluble in liquid phenol. Volatile acidic condensing agents such as hydrogen chloride, hydrochloric acid, hydrogen bromide, or mixtures of hydrogen bromide and hydrogen chloride, are preferred. It may be mentioned that hydrogen bromide, or mixtures of hydrogen bromide and hydrogen chloride, cause a marked increase in the rate of condensation of the phenol with the acetone over that obtained under otherwise similar reaction conditions, but using hydrogen chloride alone as the acidic condensing agent. Volatile sulfur-containing catalysts such as hydrogen sulfide, or mercapto carboxylic acids, may advantageously be used to cause an increase in the rate of condensation of the phenol with the acetone. When using hydrogen chloride as the acidic condensing agent the reaction mixture is usually saturated therewith. Hydrogen bromide, or mixtures of hydrogen bromide and hydrogen chloride, may be used in lesser amount, i. e. in amount less than is required to saturate the reaction mixture.

The phenol is employed in amount corresponding to at least 3 moles of the phenol per mole of the acetone used. For convenience and economy the phenol is usually employed in amount of from 3 to 12 moles of the phenol per mole of the acetone. The phenol is preferably used in anhydrous or substantially anhydrous form, although phenol containing a limited amount, e. g. 10 per cent by weight or less, of water may satisfactorily be used.

The reaction may be carried out in usual ways at temperatures between 15° and 100° C. employing a volatile acidic condensing agent. The reaction is usually carried out with stirring at temperatures between 15° and 80° C. preferably from 40° to 70° C. and at atmospheric or super-atmospheric pressure, e. g. at from 2 to 35 pounds per square inch gauge pressure.

In practice, the phenol and acetone are admixed in the desired proportions. The mixture is stirred and the volatile acidic condensing agent added thereto, suitably in amount sufficient to maintain the reaction mixture saturated with respect to the condensing agent at a reaction temperature between 15° and 100° C. Condensation is continued until the reaction mixture forms, or consists of, a slurry of crystals comprising 4,4'-isopropylidenediphenol and liquid at temperatures between 40° and 80° C. The crude reaction mixture is filtered to separate the crystalline material from the liquid. The crystalline material is washed with liquid phenol to remove the entrained liquid, together with the acidic condensing agent and by-products of the reaction, from the crystals. The crystalline material is heated in vacuum to distill the phenol from the product. The filtrate, i.e. the phenol washings and the liquid which is separated from the crystalline material, is heated to distill water formed in the reaction together with hydrochloric or hydrobromic acid therefrom. The dried filtrate containing phenol, together with a small amount of 4,4'-isopropylidenediphenol and by-products of the reaction, is recycled or reused in succeeding reactions by mixing the same and phenol with acetone in proportions as hereinbefore mentioned, and a volatile acidic condensing agent, and continuing the reaction.

The process may advantageously be carried out by procedure which involves feeding the phenol and the acetone in the desired proportions to a reaction zone, where the phenol is reacted with the acetone, in the presence of a volatile acidic condensing agent, e. g. a mixture of hydrogen bromide and hydrogen chloride, or hydrogen chloride and a volatile sulfur-containing catalyst, to form a crude reaction mixture comprising a flowable slurry of crystals and liquid, intermittently, or continuously, withdrawing crude reaction product from the reaction zone and separating the crystals from the liquid; washing the crystals with liquid phenol and heating the crystalline material to distill phenol from the 4,4'-isopropylidenediphenol product. The combined filtrate, i. e. the liquid portion of the crude reaction mixture and the phenol used in washing the crystals, is suitably heated to distill water. The dried filtrate and phenol, together with acetone, in the proportions hereinbefore mentioned, are fed to the reaction zone and reacted in the presence of a volatile acidic condensing agent and the process continued.

The following examples illustrate ways in which the principle of the invention has been applied but are not to be construed as limiting the invention.

*Example 1*

In the first of a series of four experiments, a mixture of 530 grams (5.6 moles) of phenol and 43.5 grams (0.75 mole) of acetone was placed in a glass reaction flask equipped with a reflux condenser and stirrer. The mixture was stirred and maintained at a temperature of 40° C. while adding 13 grams of HCl gas thereto. The mixture was then stirred and maintained at temperatures between 35° and 40° C. over a period of 19 hours. The reaction mixture was a slurry of crystals and liquid. It was filtered and the crystals washed with 150 grams of liquid phenol at a temperature of from 42° to 45° C. The crystalline material was heated under vacuum to distill phenol from the product. Distillation was continued to a point at which the residue was being heated at a temperature of 210° C. at 3 millimeters absolute pressure. There were obtained 139.7 grams of phenol as the distillate and 127.3 grams of 4,4'-isopropylidenediphenol as the residue. The 4,4'- isopropylidenediphenol was of high purity, i. e. it was a white crystalline material having a freezing point of 157.3° C.

The filtrate from the above reaction mixture was heated to temperatures between 60° and 65° C. at 20 millimeters absolute pressure to distill water formed in the reaction, together with hydrochloric acid therefrom. The residual liquid weighed 428.2 grams. It was mixed with 101.8 grams of phenol and 43.5 grams of acetone. This mixture was stirred and maintained at a temperature of 40° C. while adding HCl gas thereto in amount sufficient to saturate the mixture. A total of 11.2 grams of HCl was dissolved in the liquid. The mixture was then stirred and maintained at temperatures between 35° and 40° C. over a period of 19 hours. The reaction mixture was a slurry of crystals and liquid. It was filtered and the crystals washed with 175 grams of liquid phenol at a temperature of from 42° to 45° C. Phenol was distilled under vacuum from the crystalline portion. There were obtained in the distillation 176.7 grams of phenol and 171 grams of residual 4,4'-isopropylidenediphenol having a freezing point of 157.3° C.

The filtrate from the reaction mixture of the second experiment was heated as previously described to distill water and hydrochloric acid therefrom. The residual liquid weighed 378.6 grams. It was mixed with 151.4 grams of phenol and 43.5 grams of acetone. Twelve grams of HCl gas were added thereto and the mixture was maintained at temperatures between 35° and 40° C. over a reaction period of 19 hours. There was obtained a slurry of crystals and liquid. The reaction mixture was filtered and the crystalline material was washed with 175 grams of liquid phenol at a temperature of 42°–45° C. The crystalline material was heated to distill phenol from the product. There were obtained 157.7 grams of phenol as distillate and 156.1 grams of residual 4,4'-isopropylidenediphenol having a freezing point of 156.9° C.

The filtrate from the above reaction mixture was heated to distill water and hydrochloric acid therefrom. The residue weighed 416.6 grams. It was mixed with 113.4 grams of phenol, 43.5 grams of acetone and 12.8 grams of HCl gas. The mixture was stirred and maintained at a reaction temperature of 35°–40° C. for a period of 19 hours. It was a slurry of crystals and liquid. The reaction mixture was filtered to separate the crystalline material from the liquid. The crystalline material was washed with 175 grams of liquid phenol at a temperature of 42°–45° C. The crystalline material was heated to distill phenol from the product. There were obtained 157.9 grams of phenol as distillate and 174.2 grams of residual 4,4'-isopropylidenediphenol having a freezing point of 156.9° C.

Example 2

A mixture of 79 grams of phenol and 451 grams of a dry liquid filtrate (which had been separated from the crystalline 4,4'-isopropylidenediphenol obtained in a previous reaction of phenol with acetone and then dried) was placed in a glass reaction vessel equipped with a reflux condenser and stirrer. The mixture was stirred and maintained at a temperature of from 40° to 43° C. while adding 6 grams of HBr gas, 1.9 grams of beta-mercapto propionic acid and 43.5 grams of acetone thereto. Thereafter, 5.9 grams of HCl gas were added to the mixture at temperatures of from 43° to 47° C. over a period of 22 minutes. The temperature of the mixture was gradually increased to 70° C. over a period of 18 minutes. The mixture was maintained at a temperature of 70° C. over a further period of 50 minutes. The mixture was then cooled to 40° C. and was filtered to separate the crystalline material from the liquid. The crystalline material was washed with 225 grams of liquid phenol at a temperature of from 42° to 45° C. The crystalline material was heated in vacuum to distill phenol from the 4,4'-isopropylidenediphenol product. Distillation was continued to a point at which the residue was being heated at a temperature of 210° C. at 3 millimeters absolute pressure. There were obtained in the distillation, 147.4 grams of phenol and 168.0 grams of 4,4'-isopropylidenediphenol as residue, a white solid having a freezing point of 156.3° C. It was free from objectionable odor.

We claim:

1. In a process wherein phenol is condensed with acetone at temperatures between 15° and 100° C. in the presence of a volatile acidic condensing agent to form a slurry of crystalline material comprising 4,4'-isopropylidenediphenol and liquid at temperatures between 40° and 80° C., the steps which consist in separating the crystalline material from the reaction mixture, washing the crystals with liquid phenol and separating 4,4'-isopropylidenediphenol from the crystalline material.

2. In a process wherein a mixture of one molecular proportion of acetone and from 3 to 12 molecular proportions of phenol is reacted at temperatures between 15° and 100° C., in the presence of a volatile acidic condensing agent to form a slurry of crystalline material comprising 4,4'-isopropylidenediphenol and liquid at temperatures between 40° and 80° C., the steps which consist in separating the crystalline material from the reaction mixture, washing the crystals with liquid phenol and separating 4,4'-isopropylidenediphenol from the crystalline material.

3. In a process wherein a mixture of one molecular proportion of acetone and from 3 to 12 molecular equivalent proportions of phenol is reacted at temperatures between 15° and 100° C. in the presence of a volatile acidic condensing agent and a volatile sulfur-containing catalyst to form a crystalline material comprising 4,4'-isopropylidenediphenol and liquid at temperatures between 40° and 80° C., the steps which consist in separating the crystalline material from the reaction mixture, washing the crystals with liquid phenol and separating 4,4'-isopropyldienediphenol from the crystalline material.

4. In a process wherein a mixture of one molecular proportion of acetone and from 3 to 12 molecular equivalent proportions of phenol is reacted at temperatures between 15° and 80° C. in the presence of hydrogen chloride as a condensing agent to form a crystalline material comprising 4,4'-isopropylidenediphenol, the steps which consist in separating the crystalline material from the reaction mixture, washing the crystalline material with liquid phenol at a temperature between 42° and 50° C. and separating 4,4'-isopropylidenediphenol from the crystalline material.

5. In a process wherein a mixture of one molecular proportion of acetone and from 3 to 12 molecular equivalent proportions of phenol is reacted at temperatures between 15° and 80° C. in the presence of a mixture of hydrogen bromide and hydrogen chloride as the condensing agent to form a crystalline material comprising 4,4'-isopropylidenediphenol, the steps which consist in separating the crystalline product from the reaction mixture, washing the crystalline material with liquid phenol at a temperature between 42° and 50° C. and separating 4,4'-isopropylidenediphenol from the crystalline material.

6. A process which comprises feeding phenol and acetone to a reaction zone in proportions corresponding to from 3 to 12 moles of the phenol per mole of the acetone where the phenol is reacted with the acetone at temperatures between 15° and 100° C. in the presence of a volatile acidic condensing agent to form a crude product which is a slurry of crystalline material comprising 4,4'-isopropylidenediphenol and liquid at temperatures between 40° and 80° C., withdrawing crude product from the reaction zone and distilling water formed in the reaction and the volatile acidic condensing agent therefrom, cooling the crude product to temperatures between 40° and 80° C. to obtain a slurry of crystals and liquid and separating the crystals from the liquid, washing the crystals with liquid phenol, heating the crystalline portion to distill phenol from the 4,4'-isopropylidenediphenol product, and returning the liquid which is separated from the crystals and phenol to the reaction zone, together with acetone in the proportions given, and continuing the reaction as described above.

7. A process as described in claim 6, wherein the reaction is carried out in the presence of a volatile acidic condensing agent and a volatile sulfur-containing catalyst.

8. A process as described in claim 6, wherein the volatile acidic condensing agent is hydrogen chloride.

9. A process as described in claim 6, wherein the volatile acidic condensing agent is a mixture of hydrogen chloride and hydrogen bromide.

10. A process as described in claim 6, wherein the reaction is carried out in the presence of hydrogen chloride as the volatile acidic condensing agent and a volatile sulfur-containing catalyst.

11. A process which comprises feeding phenol and acetone to a reaction zone in proportions corresponding to from 3 to 12 moles of the phenol per mole of the acetone, where the phenol is reacted with the acetone at temperatures between 15° and 100° C. in the presence of a volatile acidic condensing agent to form a crude product which is a slurry of crystalline material comprising 4,4'-isopropylidenediphenol and liquid at temperatures between 40° and 80° C., withdrawing crude product from the reaction zone and separating the crystals from the liquid, washing the crystals with liquid phenol and heating the crystalline portion to distill phenol from the 4,4'-isopropylidenediphenol product, heating the liquid which is separated from the crystals to distill water and the volatile acidic condensing agent therefrom, and returning the dried liquid and phenol to the reaction zone, together with acetone in the proportions given, and continuing the reaction as described above.

12. A process as described in claim 11, wherein the reaction is carried out in the presence of a volatile acidic condensing agent and a volatile sulfur-containing catalyst.

WESLEY C. STOESSER.
EDMUND H. SOMMERFIELD.

No references cited.